Patented Nov. 10, 1936

2,060,697

UNITED STATES PATENT OFFICE 2,060,697

PROCESS OF MAKING CHROMITE REFRACTORIES

Gilbert E. Seil, Cynwyd, Pa., assignor to E. J. Lavino and Company, Philadelphia, Pa., a corporation of Delaware No Drawing. Application October 10, 1935, Serial No. 44,463

10 Claims. (Cl. 25—156)

My invention relates to a novel method of making a chromite refractory of improved physical and chemical characteristics. This application is a continuation-in-part of my copending applications Serial Numbers 540,495 and 640,099, filed May 27, 1931 and October 28, 1932, respectively, now Patents 2,028,017 and 2,028,018, respectively.

The principal object of my invention is to provide a method of producing a chromite refractory whose softening point is materially higher than that of refractories of this class of the prior art. The refractory resulting from my process will not deform at any usual furnace temperature or under any furnace conditions encountered in the use of the product, regardless of the severity thereof. Furthermore, the chromite refractory possesses a minimum tendency to spall and has a very low thermal conductivity and a low coefficient of expansion. The product is also neutral chemically and the bond is much less active from a chemical standpoint than theretofore, so that the slagging action is much less and a higher temperature can be employed before reaction starts.

Raw chrome ore is a two-component system from a refractory standpoint. The primary component comprises 70% to 90% of the ore and is a chromite spinel in which the basic radicals are FeO and MgO in varying amounts, the sum of which is always equal molecularly to the sum of the acid radicals $Cr_2O_3$ and $Al_2O_3$. The secondary component known as gangue consists of MgO and $SiO_2$ which are chemically combined as one of the magnesium silicates, but is combined in varying proportions molecularly. The lowest magnesium silicate is $(MgO)_2 \cdot (SiO_2)_3$; while the highest one that normally occurs associated with the chrome ore is $MgO \cdot SiO_2$. This second component is rarely pure and contains as impurities $Fe_2O_3$, CaO, $Al_2O_3$, $SiO_2$, etc. The melting point of these gangue materials is from 2300° F. to 2600° F., depending upon the ratio of MgO to $SiO_2$ and the percentage of impurities present.

In my copending application Serial No. 540,495, filed May 27, 1931, for "Refractory materials and method of making the same", of which the present application is a continuation-in-part, there is described the stabilization of raw chrome ore by the heat treatment thereof. As there pointed out, raw chrome ore contains many impurities which together with the chromite, unless the chrome ore is stabilized, undergo reactions and molecular rearrangements and physical changes during the burning of the preformed bricks or other shaped articles. The results obtained in the manufacture of chromite refractories from raw chrome ore, therefore, are fortuitous, shrinkage often occurring during the burning which results in deformation of the products and fractures thereof.

This is also evidenced by changes in the physical constants of the material, for example, in changes in the specific gravity and specific heat. It is, therefore, desirable preliminarily to heat-treat the chrome ore so that the constituents will be in the physical and chemical condition found at the burning temperature, thus precluding physical and chemical rearrangements during burning which cause deformation and fractures. The heat treatment also results in a very definite migration of the gangue materials, and after such treatment the gangue will be found surrounding the surfaces of the particles of chromite. The stabilization temperature should not be less than the temperature of recrystallization of the chromite of the ore or the temperature to which the preformed refractory body is subjected in burning, for example 3000° F. to 3400° F., depending on the ore being treated. The heat treatment is continued until the rearrangements are in equilibrium.

In my copending application Serial No. 640,099, filed October 28, 1932 for "Refractory materials and methods of making the same", of which the present application is also a continuation-in-part, there is described a process by which the low melting point gangue of the natural chrome ore is converted into a refractory material by the addition thereto of dead burnt magnesium oxide (periclase) at an appropriate step of the process. The magnesium oxide reacts with the magnesium silicates of the gangue, converting them into the refractory substance known as forsterite. As described in that application, the periclase may be added to untreated natural chrome ore, but more uniform and satisfactory results are obtained if the raw chrome ore is subjected to a stabilizing heat treatment such as described in application Serial No. 540,495 prior to the tempering, pressing, and burning operations. Three methods are described in application Serial No. 640,099 by which the combination of the chrome ore and the periclase may be brought about, as follows:

I. The periclase addition may be made to raw chrome ore and the two materials may be subjected to the preliminary stablizing heat treatment;

II. A portion of the periclase may be added to the raw chrome ore and the two materials may be subjected to the preliminary stabilizing heat treatment, and the remainder of the periclase may then be added to the ground heat-treated ore in the tempering operation; and III. All of the periclase may be added to the heat-treated stabilized chrome ore during the tempering operation.

The present invention relates to a modification of processes I and II, and contemplates the addition of other magnesian materials in place of dead burnt magnesium oxide to the raw chrome ore prior to the stabilizing heat treatment, which materials during the stabilizing heat-treatment furnish magnesium oxide to react with the low melting point magnesium silicates of the gangue to form forsterite, or, if an excess is employed, are converted into a dead burnt magnesium oxide functioning in the final refractory mix in a manner similar to periclase. As was pointed out, in application Serial No. 640,099 the use of a dead burnt magnesium oxide was prescribed in order to present magnesium oxide for direct reaction with the magnesium silicates of the gangue. If in the final burning of the refractory, there is chemical decomposition of the magnesian compounds, such as the liberation of water or carbon dioxide, volume changes in the preformed body result which acting with the liberated gases tend to cause deformation and fracture. The present invention departs from the teachings of my prior application and as described herein magnesian compounds which undergo chemical decomposition, making available magnesium oxide, may be used if associated with the chrome ore prior to its stabilization. Since the process of the present invention results in substantially the same product as the prior application, no claims are submitted herewith directed to the product.

The present invention contemplates the addition of certain magnesian compounds, as will hereinafter appear, to the chrome ore prior to the stabilization heat treatment, whereby a reaction is brought about between the magnesium oxide furnished upon decomposition of the compounds and the magnesium silicates, with the result that the low melting point magnesium silicates are converted into a refractory body of high melting point, known as forsterite, whose formula is $(MgO)_2 \cdot SiO_2$. The melting point of the forsterite is approximately 3500° F. in a pure state, but in the presence of an excess of magnesium oxide, the fusion of the compound is not complete at 3700° F. Both the temperatures of 3500° F. and 3700° F. are in excess of those encountered in the use of a refractory materials.

The magnesian materials which may be employed in accordance with the process of the present invention do not contain magnesium oxide in a free state and may be designated herein as magnesium salts substantially free from contaminating materials other than silica and furnishing at least approximately 85% MgO after ignition. The term "magnesium salt" as employed in this specification and the claims includes not only magnesium compounds of the type of magnesium carbonate, but also magnesium hydrate where the chemically combined water corresponds to an acid radical. The magnesium salt may be a naturally occurring mineral such as brucite, or magnesite, or may be a manufactured product such as caustic magnesite, precipitated magnesia, magnesium carbonate, or other magnesium salts which are heat-decomposable to make available magnesium oxide. Obviously, a mixture of two or more of the salts may be employed, if desired. Preferably, the substance employed will provide more than 90% MgO after ignition, less than 2.5% CaO and less than .5% $Al_2O_3$.

The amount of magnesium salt of above described type added is determined by chemical and petrographic analyses of the ore. In other words, it is desirable not only to determine the amount of MgO and $SiO_2$ chemically, but also to ascertain the type of gangue petrographically so that the distribution of the MgO and $SiO_2$ in the ore and the molecular ratios of magnesium oxide to silicon dioxide combined in the magnesium silicates may be known. The amount of magnesium salt added in the preferable instance is dependent upon the amount of magnesium oxide required to convert the magnesium silicates and free silica in the ore to forsterite without decomposition of the chromite spinel of the ore, and in general, in order to obtain the best results an excess of the compound over that required is employed in order to insure that after the reaction no free $SiO_2$ and no low melting point magnesium silicates will exist in the refractory. The low efficiency of mechanical mixing employed to bring the magnesium salt and chrome ore into contact is an additional reason for adding an excess of the magnesium salt. If the magnesium salt is employed in appreciable amounts even though the addition is not sufficient to convert all of the magnesium silicates present in the ore into forsterite, a refractory material of improved properties as compared to prior products is obtained, the improved properties being proportional to the amount of forsterite formed. In general, sufficient magnesium oxide will be furnished by the magnesium salt and dead burnt magnesium oxide (if employed) to give at least 11.5% MgO in the final mix. In most instances, the amount of magnesium oxide furnished will be sufficient to provide between 15.5% and 25% in the final mix. While the upper limit of magnesium oxide furnished is not critical and considerable excess can be added without detriment, it must not be added in such amount as will result in the formation of appreciable quantity of water-soluble magnesium chromate. The presence of magnesium chromate in the refractory is a direct indication tha the upper limit has been exceeded.

As previously pointed out, the magnesium salt is associated with the ore prior to the preliminary heat treatment thereof. If desired, all of the magnesium oxide necessary for reaction with the magnesium silicates of the gangue may be furnished to the chrome ore in the form of the hereindescribed magnesium salts prior to heat treatment. On the other hand, a portion of the magnesium oxide may be obtained from these compounds during heat treatment and the remainder may be furnished by dead burnt crystallized magnesium oxide, such as periclase, added to the tempering pan in the preparation of the final refractory mix.

In either of the above cases, the heat-treated chrome ore is ground to produce the desired sizes of particles and is tempered according to any well known method in the presence of plasticizers and binders if desired.

The tempered material then is pressed, for example, either in a lever or an hydraulic press, as has previously been employed in the manufacture of similar refractories. The pressure in the press may vary widely, for instance, a pressure of 600 pounds per square inch, or higher, may be employed, depending upon the shape, size, and porosity required. The refractory is burned by any known method, for example, in a tunnel kiln with a controlled time and temperature curve, both for heating and cooling. The burning temperature is preferably higher than that employed in the manufacture of the usual chromite refractories, and in fact a burning temperature higher than 3000° F., corresponding to cone 28 completely down, is particularly suitable.

In a typical case, crude chrome ore is employed whose primary mineral is chromite and whose secondary mineral is one or more of the members of the serpentine family, and whose chemical analysis is as follows:

| | Per cent |
|---|---|
| $Cr_2O_3$ | 42.0 to 45.0 |
| $SiO_2$ | 9.5 to 10.0 |
| FeO | 13.0 to 16.0 |
| $Al_2O_3$ | 11.0 to 14.0 |
| CaO | 1.0 or less |
| MgO | 12.0 to 15.0 |

It will be noted that the ore contains approximately 10% of silica, and in order to determine the amount of magnesium oxide to be furnished, if only approximate figures are desired, it may be assumed that the given amount of silica will require magnesium oxide in the ratio of two parts of magnesium oxide to one part of silica to form forsterite [$(MgO)_2 \cdot SiO_2$]. A calculation taking into consideration the molecular weights of the compounds, therefore, shows that approximately thirteen parts of magnesium oxide are required. However, as previously pointed out, it is desirable to employ an excess of magnesium oxide in order to insure that all of the silica either free or combined as magnesium silicate will be converted into forsterite, and experiments have shown that with an ore of the above analysis 20.5% of magnesium oxide should be furnished either by the magnesium salts or by these compounds and the dead burnt magnesium oxide.

If all the magnesium oxide required is furnished by the magnesium salt, the ground crude chrome ore is mixed with the desired amount of the salt in finely divided condition, for example 77.5% by weight of raw ore and 22½% of a salt furnishing 92% MgO after ignition. Briquets are then made by homogeneously and intimately mixing the particles and the mass is pressed. The briquets are then subjected to the stabilizing heat-treatment process, preferably by being passed through a rotary kiln at 3000° F. to 3500° F., and more specifically at temperatures between 3200° F. and 3400° F. The best results are obtained by increasing the temperature very quickly from just below the melting point of the lowest melting point magnesium silicate up to the desired temperature, say 3200° F., in order to get a very mobile liquid to react with the magnesium oxide. The time required varies inversely with the temperature, and the briquets are subjected to the stabilization temperature for a sufficient time to convert the magnesium silicates and silica into forsterite and to allow the chemical and molecular changes and rearrangements to take place in the chrome ore. The resulting product is a two-component body, both components of which have a high melting point, and a microscopic examination shows that the forsterite is found in a thin film surrounding the chromite particles.

After the heat treatment, the product is ground to prepare suitable ratios of grain sizes for the manufacture of refractory shapes. For example, two separate grinds are prepared which will be termed herein "Grind A" and "Grind B". The screens hereinafter discussed are all of the dimensions adopted by the Bureau of Standards. Grind A is a so-called roll-crusher product and is sized with one screen, everything that passes through a 6-mesh screen being employed. A screen analysis shows that of the material that passes through the 6-mesh screen, not less than 85% is caught on a 40-mesh screen, the remainder passing through. The particles are flat-faced, sharp, and pointed, and are of three approximately equal dimensions, without rounded corners. Grind B is a pulverized material made in a rubbing mill which results in round cornered particles of nearly spherical shape. All of the particles pass through a 20-mesh screen and at least 50% pass through a 200-mesh screen, although in the most preferred case, 70% passes through said screen. 77½ parts of Grind A by weight and 22½ parts of Grind B by weight are placed in a tempering pan to which is added .1% of goulac, .25% of boiled starch prepared by adding borax to starch and subsequently heating the mixture, and 2% of an oil such as fuel oil. Water is added to the mixture in proportions sufficient to give the necessary plasticity to the mass during the pressing operation. For example, the moisture content may be brought up by the addition of water to about 4% of the weight of the ore. The material is treated in the tempering pan until it is uniformly mixed, which usually requires only five or ten minutes. It is desirable to treat the material in the pan so that it is not further ground and the stirring device may be rubber-covered and of relatively light weight to insure this. There must, however, be interstitial flow between the particles so that a homogeneous mix is obtained. After the tempering, the mass is pressed to the desired shape, size, and porosity in any desired manner, such as in a lever or hydraulic press with a pressure of 600 pounds per square inch or higher, depending upon the size, shape, and porosity required. The burning is accomplished by any known method, for example, by passing the shaped material through a tunnel kiln with a controlled time and temperature curve both for heating and cooling. Preferably, a ninety hour cycle is used through the tunnel which may be 327 feet long of which 85 feet in the center is the actual fire zone. The temperature of the furnace at the beginning of the fire zone is in the neighborhood of 2200° F. and reaches its peak at 3000° F. or higher. The material remains in the fire zone for approximately twenty-four hours.

If only a portion of the magnesium oxide required, for example 10% based on the weight of final refractory mix, is furnished by the magnesium salt added prior to the heat treatment, the additional amount may be furnished by adding dead burnt crystallized magnesium oxide to the stabilized ore prior to tempering. In this case, the mixture of crude chrome ore and magnesium salt is subjected to the heat-treatment set forth above. After the stabilization step, the periclase necessary to make up the total amount of magnesium oxide required is ground with sufficient heat-treated ore to make up 22½% of the total mix in such a manner as to give a grind of the characteristics of Grind B. 77½ parts of Grind A made up of treated ore and the 22½ parts of Grind B are added to the tempering pan.

The process of making the refractory material thereafter may be carried out in the same manner as described in connection with the prior method.

Refractories made in accordance with the process of the present invention are characterized by the fact that the low melting point gangue has been converted into a refractory material, forsterite, which is spread as a thin film over the chromite particles. Chromite refractories manufactured previous to my invention have a softening point between 2300° F. and 2600° F. and deform at these temperatures under a load of 25 pounds per square inch. They also show marked shrinkage at 2600° F. and sag under their own weight at this temperature. If submitted to a spalling test, a high spalling loss will be encountered. The bond is also active chemically and tends to react with materials in the furnace atmosphere. In contra-distinction to these properties, the chromite brick made by the present invention does not soften at 3500° F. and, therefore, does not deform or sag at any furnace temperature or under any furnace conditions up to 3500° F. or even higher. The tendency to spall has been minimized and the bond is practically inactive chemically and, therefore, no difficulty is encountered with slagging reactions, it being possible to carry the refractory to much higher temperatures than previously before reaction starts. The brick is neutral chemically and has a very low thermal conductivity and a low coefficient of expansion.

Considerable modification is possible in the percentage of magnesium salt added, as well as in the methods employed in stabilizing the crude chrome ore and in the manufacture of the refractory body, without departing from the essential features of the present invention.

I claim:

1. The process of making a burned chromite refractory from natural chrome ore characterized by a substantially high softening point due to the conversion of at least a substantial portion of the low melting point gangue into a refractory material without decomposition of the chromite spinel of the ore which comprises heat-treating chrome ore in the presence of a magnesium salt furnishing magnesium oxide after ignition, at a temperature at least equal to the burning temperature of the refractory, the said magnesium salt being present in an amount sufficient to furnish magnesium oxide to convert at least a substantial portion of the low melting point gangue into forsterite but insufficient to decompose the chromite spinel of the ore, grinding a portion of said treated ore to form relatively coarse granules, grinding another portion thereof to form relatively fine particles, tempering a suitable mixture of said coarse and said fine treated ore, and thereafter shaping and burning the mass.

2. The process of making a chromite material adapted for use in a refractory from natural chrome ore characterized by a substantially high softening point due to the conversion of at least a substantial portion of the low melting point gangue into forsterite without decomposition of the chromite spinel of the ore, which comprises heat-treating chrome ore in the presence of a magnesium salt, substantially free from contaminating materials other than silica and furnishing at least approximately 85% magnesium oxide after ignition, at a temperature at least equal to the burning temperature of the refractory, the said magnesium salt being present in an amount sufficient to furnish magnesium oxide to convert at least a substantial portion of the low melting point gangue into forsterite but insufficient to decompose the chromite spinel of the ore, preparing a mix of suitable grain size, and thereby forming a composition characterized, after firing, by a substantially higher softening point than a similar refractory not treated with said magnesium salt.

3. The process of making a burned chromite refractory from natural chrome ore characterized by a substantially high softening point due to the conversion of at least a substantial portion of the low melting point gangue into a refractory material without decomposition of the chromite spinel of the ore which comprises heat-treating chrome ore in the presence of a magnesium salt furnishing magnesium oxide after ignition, at a temperature higher than 3000° F., the magnesium salt being present in an amount sufficient to furnish magnesium oxide to convert at least a substantial portion of the low melting point gangue into forsterite but insufficient to decompose the chromite spinel of the ore, tempering a mix of suitable grain size, and thereafter shaping and burning the mass.

4. The process of making a burned chromite refractory from natural chrome ore characterized by a substantially high softening point due to the conversion of substantially all the low melting point gangue into forsterite without decomposition of the chromite spinel which comprises heat-treating chrome ore in the presence of a magnesium salt, substantially free from contaminating materials other than silica and furnishing at least approximately 85% magnesium oxide after ignition, at a temperature higher than 3000° F., the said magnesium salt being present in an amount sufficient to furnish magnesium oxide to convert substantially all of the low melting point gangue into forsterite, but insufficient to decompose the chromite spinel of the ore, tempering a mix of suitable grain size, shaping the mass, and thereafter burning the product at a temperature higher than 3000° F.

5. The process of making a burned chromite refractory from natural chrome ore characterized by a substantially high softening point due to the conversion of at least a substantial portion of the low melting point gangue into forsterite without decomposition of the chromite spinel which comprises heat-treating chrome ore in the presence of a naturally occurring magnesium salt, substantially free from contaminating materials other than silica and furnishing at least approximately 85% magnesium oxide after ignition, at a temperature higher than 3000° F., the said magnesium salt being present in an amount sufficient to furnish magnesium oxide to convert at least a substantial portion of the low melting point gangue into forsterite, but insufficient to decompose the chromite spinel of the ore, tempering a mix of suitable grain size, shaping the mass, and thereafter burning the product at a temperature higher than 3000° F.

6. The process of making a burned chromite refractory from natural chrome ore characterized by a substantially high softening point due to the conversion of substantially all the low melting point gangue into forsterite without decomposition of the chromite spinel which comprises forming briquets of relatively coarse chrome ore and a relatively finely divided naturally occurring magnesium salt, substantially free from contaminating materials other than silica and furnishing at least approximately 85% magnesium oxide after ignition, heating said briquets at a temperature higher than 3000° F., the said magnesium salt being present in an amount sufficient to furnish magnesium oxide to convert substantially all of the low melting point gangue into forsterite, but insufficient to decompose the chromite spinel of the ore, grinding a portion of said treated ore to form relatively coarse granules, grinding another portion thereof to form relatively fine particles, tempering a suitable mixture of said coarse and said fine treated ore, shaping the mass, and thereafter burning the product at a temperature higher than 3000° F.

7. The process of making a burned chromite refractory from natural chrome ore characterized by a substantially high softening point due to the conversion of at least a substantial portion of the low melting point gangue into forsterite without decomposition of the chromite spinel which comprises heat-treating chrome ore in the presence of a magnesium salt, substantially free from contaminating materials other than silica and furnishing at least approximately 85% magnesium oxide after ignition, at a temperature higher than 3000° F., the said magnesium salt being present in an amount sufficient to furnish at least 11.5% of magnesium oxide in the final mix but insufficient to decompose the chromite spinel of the ore, tempering a mix of suitable grain size, shaping the mass, and thereafter burning the product at a temperature higher than 3000° F.

8. The process of making a burned chromite refractory from natural chrome ore characterized by a substantially high softening point due to the conversion of at least a substantial portion of the low melting point gangue into forsterite without decomposition of the chromite spinel which comprises forming briquets of relatively coarse chrome ore and a relatively finely divided magnesium salt, substantially free from contaminating materials other than silica and furnishing at least approximately 85% magnesium oxide after ignition, heating said briquets at a temperature higher than 3000° F., the said magnesium salt being present in an amount sufficient to furnish between 15.5% and 25% of magnesium oxide in the final mix, grinding a portion of said treated ore to form relatively coarse granules, grinding another portion thereof to form relatively fine particles, tempering a suitable mixture of said coarse and said fine treated ore, shaping the mass, and thereafter burning the product at a temperature higher than 3000° F.

9. The process of making a burned chromite refractory from natural chrome ore characterized by a substantially high softening point due to the conversion of at least a substantial portion of the low melting point gangue into forsterite without decomposition of the chromite spinel which comprises forming briquets of relatively coarse chrome ore and a relatively finely divided magnesium salt, substantially free from contaminating materials other than silica and furnishing at least approximately 85% magnesium oxide after ignition, heating said briquets at a temperature higher than 3000° F., preparing a mix of suitable grain size, associating dead burned crystallized magnesium oxide with said mix, the total magnesium oxide furnished to the chrome ore being sufficient to convert a substantial portion of the low melting point gangue into forsterite, but insufficient to decompose the chromite spinel of the ore, tempering said mix, shaping the mass, and thereafter burning said product at a temperature higher than 3000° F.

10. The process of making a burned chromite refractory from natural chrome ore characterized by a substantially high softening point due to the conversion of substantially all the low melting point gangue into forsterite without decomposition of the chromite spinel which comprises heat-treating chrome ore in the presence of a magnesium salt, substantially free from contaminating materials other than silica and furnishing at least approximately 85% magnesium oxide after ignition at a temperature higher than 3000° F., preparing a mix of suitable grain size, associating dead burned crystallized magnesium oxide with said mix, the total magnesium oxide furnished to the chrome ore being sufficient to convert substantially all of the low melting point gangue into forsterite, but insufficient to decompose the chromite spinel of the ore, tempering said mix, shaping the mass, and thereafter burning said product at a temperature higher than 3000° F.

GILBERT E. SEIL.